United States Patent
Shih et al.

(10) Patent No.: US 9,442,024 B2
(45) Date of Patent: Sep. 13, 2016

(54) MULTI-MODE TEMPERATURE MEASURING DEVICE

(71) Applicant: AVITA CORPORATION, New Taipei (TW)

(72) Inventors: Hsuan-Hao Shih, New Taipei (TW); Jui-Teng Wang, New Taipei (TW); Ta-Chieh Yang, New Taipei (TW)

(73) Assignee: AVITA CORPORATION, New Taipei (TW)

( * ) Notice: Subject to any disclaimer, the term of this patent is extended or adjusted under 35 U.S.C. 154(b) by 385 days.

(21) Appl. No.: 14/095,341

(22) Filed: Dec. 3, 2013

(65) Prior Publication Data

US 2014/0153610 A1 Jun. 5, 2014

Related U.S. Application Data

(60) Provisional application No. 61/732,651, filed on Dec. 3, 2012.

(51) Int. Cl.
| | | |
|---|---|---|
| *G01J 5/00* | (2006.01) | |
| *G01K 1/00* | (2006.01) | |
| *G01K 13/00* | (2006.01) | |
| *G01J 5/04* | (2006.01) | |
| *G01J 5/02* | (2006.01) | |

(52) U.S. Cl.
CPC ........... *G01K 13/004* (2013.01); *G01J 5/0205* (2013.01); *G01J 5/047* (2013.01); *G01J 5/049* (2013.01)

(58) Field of Classification Search
USPC .................. 374/120, 121, 131, 208, 130
See application file for complete search history.

(56) References Cited

U.S. PATENT DOCUMENTS

| | | | |
|---|---|---|---|
| 5,991,652 A * | 11/1999 | Barthelemy | G01J 5/04 374/208 |
| 6,789,936 B1 | 9/2004 | Kraus et al. | |
| 7,056,012 B2 * | 6/2006 | Blakeley, III | G01J 5/041 374/120 |
| 7,169,316 B1 * | 1/2007 | Silverbrook | B41J 2/14427 216/27 |
| 7,306,366 B1 * | 12/2007 | Camenzind | B25F 1/00 30/155 |
| 7,520,668 B2 * | 4/2009 | Chen | G01J 5/02 374/121 |
| 7,651,265 B2 * | 1/2010 | Yang | G01J 5/0022 374/121 |
| 2004/0047392 A1 | 3/2004 | Wu et al. | |
| 2004/0095985 A1 | 5/2004 | Ko et al. | |
| 2004/0264546 A1 * | 12/2004 | Wong | G01K 13/002 374/209 |

(Continued)

FOREIGN PATENT DOCUMENTS

| | | |
|---|---|---|
| CN | 2575633 Y | 9/2003 |
| DE | 102009052300 A1 | 5/2011 |

(Continued)

*Primary Examiner* — Mirellys Jagan
(74) *Attorney, Agent, or Firm* — Raymond Y. Chan; David and Raymond Patent Firm

(57) ABSTRACT

A multi-mode temperature measuring device includes a first case, a second case, an IR sensing element and a wave-collection element. The first case has a measuring portion and a bottom portion, which are located at opposite sides of the first case. The measuring portion has a first through hole. The second case is connected with the first case and is rotatable from a first position to a second position. The IR sensing element is disposed at the measuring portion and corresponding to the first through hole. The wave-collection element is disposed in the second case and has a second through hole. When the second case is located at the first position, the second through hole is disposed opposite to the first through hole. When the second case is located at the second position, the second case is fixed at the bottom portion of the first case.

10 Claims, 4 Drawing Sheets

(56) References Cited

U.S. PATENT DOCUMENTS

| | | | |
|---|---|---|---|
| 2005/0226307 A1* | 10/2005 | Lussier | G01J 5/0022 374/131 |
| 2006/0052677 A1* | 3/2006 | Yu | G01J 5/02 600/301 |
| 2011/0110395 A1* | 5/2011 | Fraden | G01J 5/0003 374/130 |

FOREIGN PATENT DOCUMENTS

| | | |
|---|---|---|
| EP | 1065486 A1 | 1/2001 |
| EP | 2320206 A1 | 5/2011 |
| TW | 463038 | 6/1989 |
| TW | M270786 | 8/2004 |
| TW | M272505 U | 8/2005 |
| TW | M445958 U | 2/2013 |

* cited by examiner

MULTI-MODE TEMPERATURE MEASURING DEVICE

CROSS REFERENCE TO RELATED APPLICATIONS

The non-provisional patent application claims priority to U.S. provisional patent application with Ser. No. 61/732,651 filed on Dec. 3, 2012. This and all other extrinsic materials discussed herein are incorporated by reference in their entirety.

BACKGROUND OF THE INVENTION

1. Field of Invention

The present invention relates to a multi-mode temperature measuring device and, in particular, to a multi-mode IR temperature measuring device

2. Related Art

In the past, the temperature measurement is a long term and complex procedure. During the temperature measurement, the conventional measuring device is provided to contact with a target. However, if the surface temperature of the target is too high or the target is too far, too small, or moving, the precise temperature measurement becomes very difficult. Recently, this problem has been perfectly solved by the infrared (IR) sensing technology.

In different temperatures, an object can irradiate out the infrared ray of different frequencies. The IR measuring technology utilizes this feature to detect the temperature of the object after receiving the IR radiation by the IR sensitive material. The common temperature measuring device (e.g. the ear thermometer or forehead thermometer) can simply measure the temperature of the ear or forehead to detect the body temperature of a user. The measuring head of the ear thermometer is inserted into the ear to detect the ear temperature, while the measuring head of the forehead thermometer aligns to and scans the forehead area to obtain the forehead temperature. In other words, the ear thermometer is limited to detect the ear temperature only, and the forehead thermometer is limited to detect the forehead temperature only. This is quite a restriction of the ear and forehead thermometers.

Therefore, it is an important subject to provide a multi-mode temperature measuring device that can change measuring modes by simple operations so as to provide a convenient operation experience and remain the stability and accuracy of the temperature measurement.

SUMMARY OF THE INVENTION

In view of the foregoing subject, an objective of the present invention is to provide a multi-mode temperature measuring device that can change measuring modes by simple operations so as to provide a convenient operation experience and remain the stability and accuracy of the temperature measurement.

To achieve the above objective, the present invention discloses a multi-mode temperature measuring device including a first case, a second case, an infrared (IR) sensing element and a wave-collection element. The first case has a measuring portion and a bottom portion, which are located at opposite sides of the first case. The measuring portion has a first through hole. The second case is connected with the first case and is rotatable from a first position to a second position with respect to the first case. The IR sensing element is disposed at the measuring portion and corresponding to the first through hole. The wave-collection element is disposed in the second case and has a second through hole. When the second case is located at the first position, the second through hole is disposed opposite to the first through hole. When the second case is located at the second position, the second case is fixed at the bottom portion of the first case In one embodiment, the multi-mode temperature measuring device further comprises a linking mechanism, and the second case is rotatable from the first position to the second position with respect to the first case via the linking mechanism.

In one embodiment, when the second case is located at the first position or the second position, the second case is locked with the first case.

In one embodiment, when the second case is located at the first position, the multi-mode temperature measuring device is operated at a forehead-temperature measuring mode; otherwise, when the second case is located at the second position, the multi-mode temperature measuring device is operated at an ear-temperature measuring mode.

In one embodiment, the second case has a top portion, and the wave-collection element is disposed in the top portion.

In one embodiment, when the second case is located at the first position, the measuring portion is located in the top portion.

In one embodiment, the top portion has an opening, and when the second case is rotated to the first position, the opening passes over the measuring portion.

In one embodiment, the second case further has two connecting arms, and the top portion is connected to the first case through the connecting arms.

In one embodiment, when the second case is located at the first position, an IR ray is collected by the wave-collection element and then received by the IR sensing element.

In one embodiment, the inner profile of the wave-collection element is correspondingly fitting with the outer profile of the IR sensing element.

As mentioned above, in the multi-mode temperature measuring device of the invention, the second case is connected with the first case and is rotatable from a first position to a second position with respect to the first case. When the second case is located at the first position with respect to the first case, the second through hole of the wave-collection element is disposed opposite to the first through hole of the measuring portion. In this configuration, the IR radiation can pass over the second through hole and then be collected by the wave-collection element. Afterwards, the collected IR radiation can pass through the first through hole and then be received by the IR sensing element. Accordingly, the multi-mode temperature measuring device is operated at a forehead-temperature measuring mode. Otherwise, when the second case is located at the second position with respect to the first case, the multi-mode temperature measuring device is operated at an ear-temperature measuring mode. As a result, the multi-mode temperature measuring device of the present invention can change measuring modes by simple operations so as to provide a convenient operation experience and remain the stability and accuracy of the temperature measurement.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
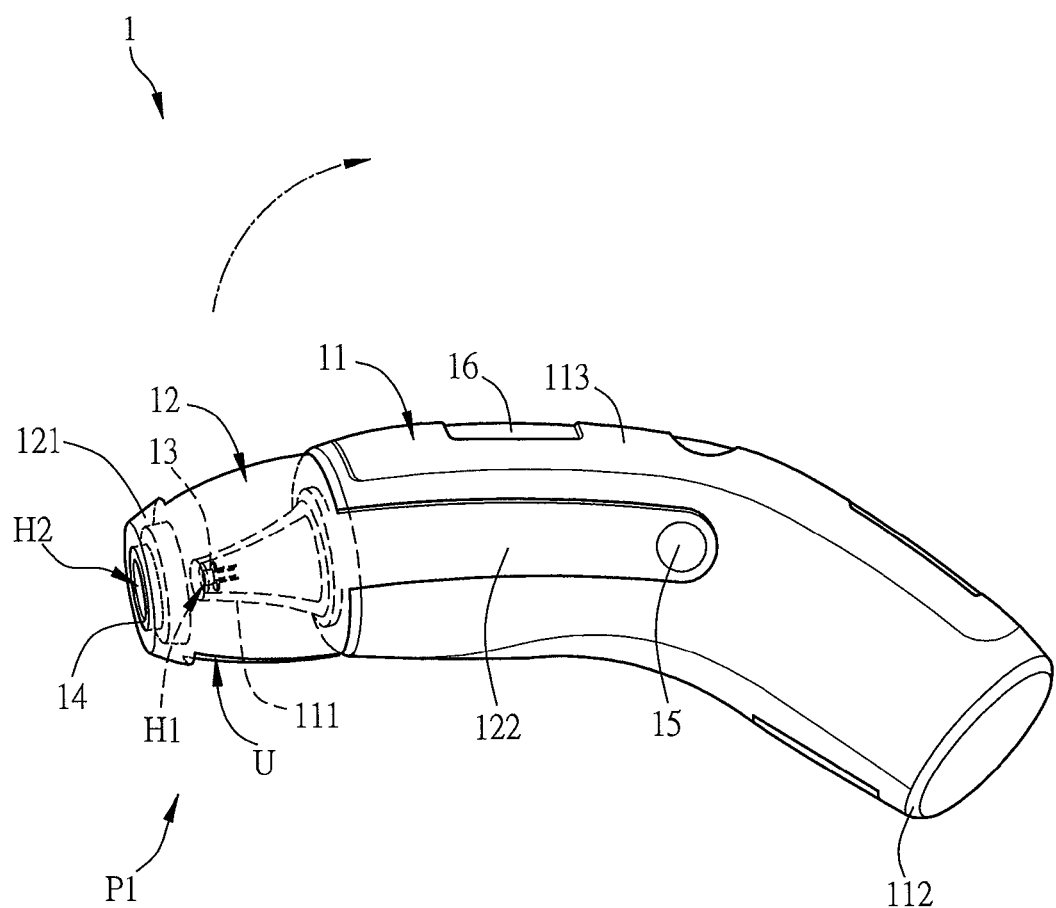
FIG. 1 is a schematic diagram showing a multi-mode temperature measuring device according to an embodiment of the present invention, which is operated in a forehead-temperature measuring mode.
Figure 2:
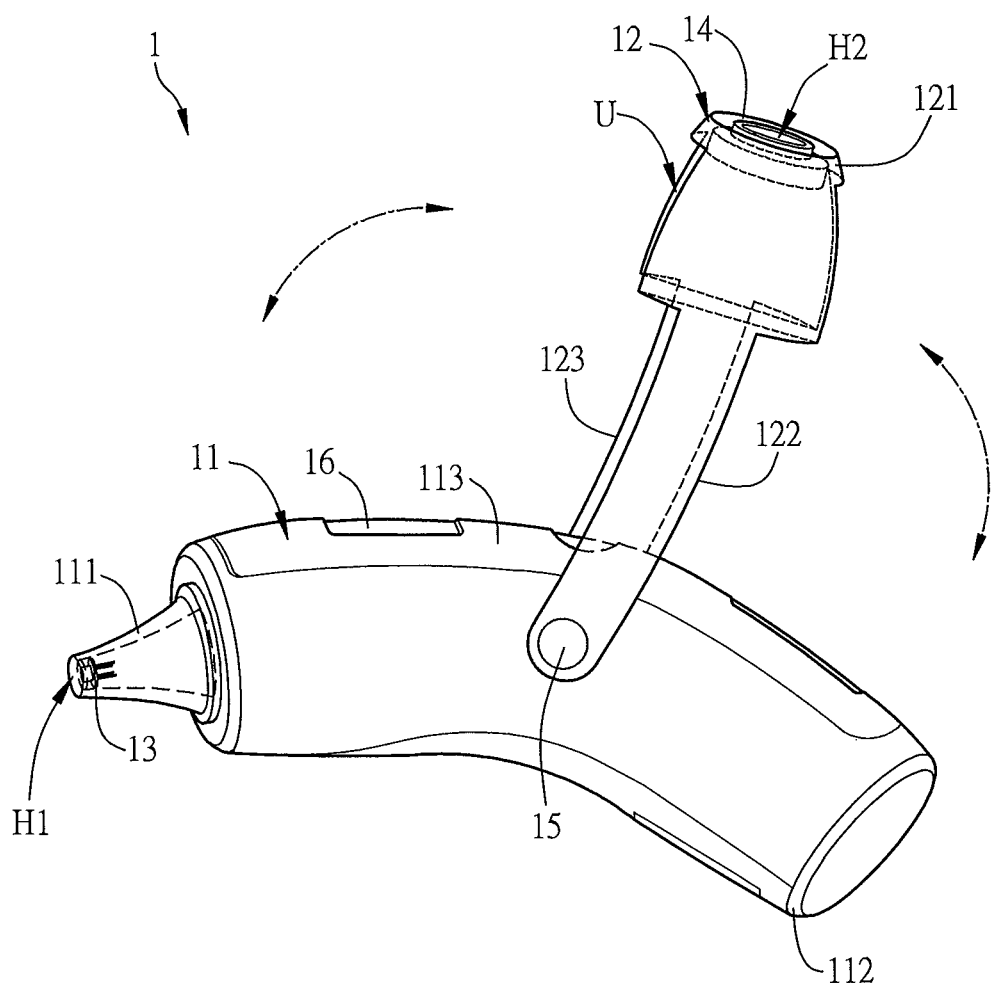
FIG. 2 is a schematic diagram showing the operation for switching modes of the multi-mode temperature measuring device according to the embodiment of the present invention.
Figure 3:
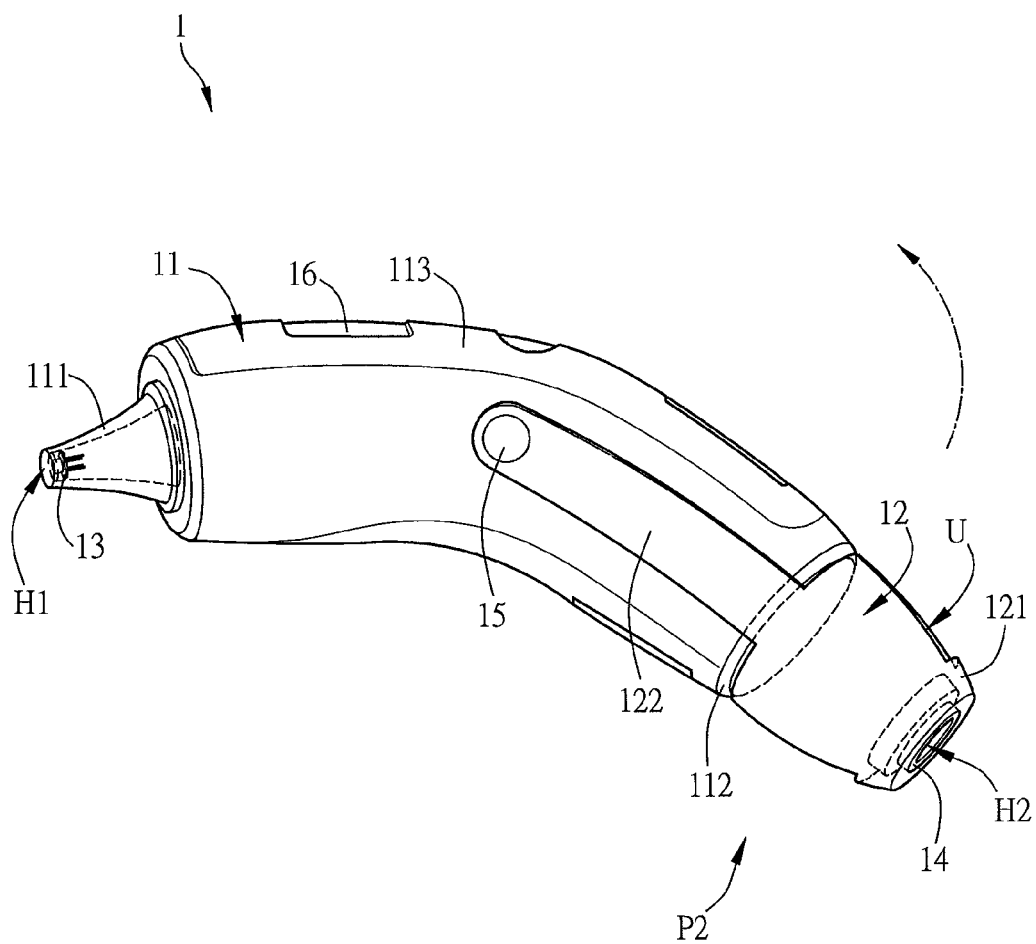
FIG. 3 is a schematic diagram showing a multi-mode temperature measuring device according to an embodiment of the present invention, which is operated in an ear-temperature measuring mode.
Figure 4:
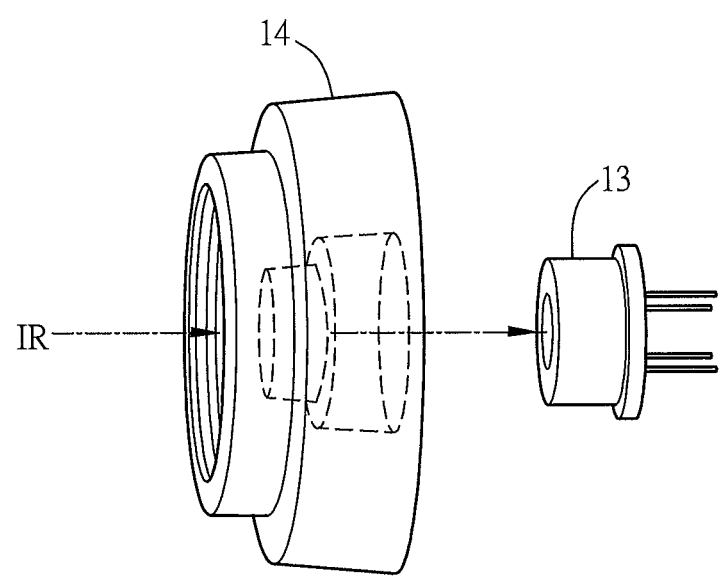
FIG. 4 is a schematic diagram showing the relative positions of the IR sensing element and the wave-collection element of the multi-mode temperature measuring device of FIG. 1.

FIG. 1 is a schematic diagram showing a multi-mode temperature measuring device 1 according to an embodiment of the present invention, which is operated in a forehead-temperature measuring mode. FIG. 2 is a schematic diagram showing the operation for switching modes of the multi-mode temperature measuring device 1. FIG. 3 is a schematic diagram showing the multi-mode temperature measuring device 1, which is operated in an ear-temperature measuring mode. FIG. 4 is a schematic diagram showing the relative positions of the IR sensing element and the wave-collection element of the multi-mode temperature measuring device 1 of FIG. 1. In this embodiment, the multi-mode temperature measuring device 1 is an IR temperature measuring device for both of ear-temperature and forehead-temperature measurements. To be noted, FIG. 4 only shows the relative positions of the IR sensing element 13 and the wave-collection element 14 of the multi-mode temperature measuring device 1, and the residual elements of the multi-mode temperature measuring device 1 are not shown.

The multi-mode temperature measuring device 1 includes a first case 11, a second case 12, an infrared (IR) sensing element 13 and a wave-collection element 14.

The first case 11 containing the major measuring parts of the multi-mode temperature measuring device 1 is a single case or is composed of several parts. In this embodiment, the first case 11 includes a measuring portion 111, a bottom portion 112 and a body portion 113. The measuring portion 111 and the bottom portion 112 are located at opposite sides of the body portion 113. The user can hold the body portion 113 to operate the measuring device 1, and most of control circuit elements of the multi-mode temperature measuring device 1 are configured within the body portion 113. The measuring portion 111 includes the temperature measuring parts, and the bottom portion 112 is disposed opposite to the measuring portion 111. In this embodiment, the measuring portion 111 has a first through hole H1.

The second case 12 is connected with the first case 11 and is rotatable from a first position P1 (see FIG. 1) to a second position P2 (see FIG. 3) with respect to the first case 11. Herein, the second case 12 also can be a single case or be composed of several parts, and it includes a top portion 121. As shown in figures, the top portion 121 of the second case 12 has at least one opening U. When the second case 12 switches between the first position P1 and the second position P2 with respect to the first case 11, the opening U can pass over the measuring portion 111 of the first case 11. Accordingly, when the second case 12 is located at the first position P1, the top portion 121 covers the measuring portion 111, and the wave-collection element 14 is located opposite to the IR sensing element 13. Thus, an infrared ray can be collected by the wave-collection element 14 and then received by the IR sensing element 13.

In addition, the second case 12 may further include two connecting arms 122 and 123, and the top portion 121 is connected to the first case 11 through the connecting arms 122 and 123. For example, the second case 12 is connected to the body portion 113 of the first case 11 through the connecting arms 122 and 123. The top portion 121 and the connecting arms 122 and 123 can be integrally formed as one piece or be composed of several parts. In this embodiment, the top portion 121 and the connecting arms 122 and 123 are integrally formed as one piece. Besides, the multi-mode temperature measuring device 1 may further include a linking mechanism 15 such as a hinge. The top portion 121 of the second case 12 is rotatable from the first position P1 to the second position P2 or from the second position P2 to the first position P1 with respect to the first case 11 via the linking mechanism 15 and the connecting arms 122 and 123.

The IR sensing element 13 is disposed in the measuring portion 111 of the first case 11 and is located corresponding to the first through hole H1. In this embodiment, when the IR radiation emitted from the human body enters the first case 11 through the first through hole H1, the IR sensing element 13 disposed corresponding to the first through hole H1 can then receive the IR radiation. In addition, the multi-mode temperature measuring device 1 may further include a control circuit board (not shown) disposed in the body portion 113 of the first case 11 and electrically connected with the IR sensing element 13. The control circuit board includes a signal processing circuit for transforming the IR radiation energy received by the IR sensing element 13 into a temperature value. The IR sensing element 13 includes, for example but not limited to, a thermopile that is composed of a plurality of serially connected thermocouples. The thermopile can generate a voltage difference according to the received IR radiation, and then the signal processing circuit of the control circuit board can calculate to obtain the desired temperature value.

The wave-collection element 14 is disposed in the second case 12 and includes a second through hole H2. In this embodiment, the wave-collection element 14 is located in the top portion 121 of the second case 12. Obviously, the wave-collection element 14 is a component for collecting the IR radiation. In the multi-mode temperature measuring device 1 of FIG. 1, when the second case 12 rotates to the first position P1 with respect to the first case 11, the multi-mode temperature measuring device 1 is operated in a forehead-temperature measuring mode. In the forehead-temperature measuring mode, the measuring portion 111 is located in the top portion 121 of the second case 12, and the second through hole H2 of the wave-collection element 14 is located opposite to the first through hole H1 of the measuring portion 111. Accordingly, the IR radiation emitted from the forehead of a user passes through the second through hole H2 to be collected by the wave-collection element 14, and then passes through the first through hole H1 to be received by the IR sensing element 13. Finally, the forehead temperature of the user can be detected.

When the second case 12 rotates from the first position P1 to the second position P2 with respect to the first case 11

(following FIG. 1, FIG. 2 and FIG. 3), the multi-mode temperature measuring device 1 is switched to an ear-temperature measuring mode. In the ear-temperature measuring mode, the user can insert the measuring portion 111 into the ear to detect the ear temperature. In other words, when the second case 12 rotates to the first position P1 with respect to the first case 11, the second case 12 is fixed corresponding to the measuring portion 111 of the first case 11, and the multi-mode temperature measuring device 1 is operated in the forehead-temperature measuring mode. Otherwise, when the second case 12 rotates from the first position P1 to the second position P2 with respect to the first case 11, the second case 12 is fixed corresponding to the bottom portion 112 of the first case 11, and the multi-mode temperature measuring device 1 is operated in the ear-temperature measuring mode.

In more specific, the second case 12 may be locked corresponding to the measuring portion 111 or the bottom portion 112 of the first case 11. Since the second case 12 is firmly fixed on the first case 11, the multi-mode temperature measuring device 1 seems clearer and simpler, and has more integral and beautiful shape and profile. Besides, the wave-collection element 14 can protect the IR sensing element 13, so that fingers and external contaminants can not contact the IR sensing element 13 easily, thereby reducing the pollution of the IR sensing element 13. When the second case 12 is located at the first position P1, the wave-collection element 14 can cover the IR sensing element 13 for providing the heat dissipation and isolation effects. This is benefit to the stability of the forehead-temperature measurement. As shown in FIG. 4, the inner profile of the wave-collection element 14 is fitting to the outer profile of the IR sensing element 13, so that the wave-collection element 14 can not only collect the IR radiation, but also position the IR sensing element 13. This feature can remain the stability and accuracy of the temperature measurement.

Moreover, the multi-mode temperature measuring device 1 of the embodiment may further include a display unit 16, which is disposed on the body portion 113 of the first case 11 and electrically connected with the control circuit board. When the signal processing circuit of the control circuit board transforms the IR radiation energy received by the IR sensing element 13 to obtain the temperature value, the control circuit board instructs the display unit 16 to show the temperature value. As a result, the user can easily read out the detected temperature value.

Besides, the multi-mode temperature measuring device 1 may further include an alert unit (not shown) disposed in the first case 11 and electrically connected with the control circuit board. For example, the alert unit can be a buzzer, a speaker or a lighting element. The alert unit can remind the user about the operation status of the multi-mode temperature measuring device 1. For example, when the multi-mode temperature measuring device 1 is powered on, the alert unit can output an alert signal to remind the user that the multi-mode temperature measuring device 1 is powered on. In addition, when the multi-mode temperature measuring device 1 is operated in the sensing process, the alert unit can output another alert signal to remind the user that the multi-mode temperature measuring device 1 is under a sensing process. When the temperature measuring process is finished, the alert unit can output another alert signal to remind the user that the temperature measuring process is finished. Accordingly, the manufacturer can design various alert signals for different statuses of the multi-mode temperature measuring device 1. Of course, the multi-mode temperature measuring device 1 can be configured with all of the above-mentioned alert signals for different statuses.

To sum up, in the multi-mode temperature measuring device of the invention, the second case is connected with the first case and is rotatable from a first position to a second position with respect to the first case. When the second case is located at the first position with respect to the first case, the second through hole of the wave-collection element is disposed opposite to the first through hole of the measuring portion. In this configuration, the IR radiation can pass over the second through hole and then be collected by the wave-collection element. Afterwards, the collected IR radiation can pass through the first through hole and then be received by the IR sensing element. Accordingly, the multi-mode temperature measuring device is operated at a forehead-temperature measuring mode. Otherwise, when the second case is located at the second position with respect to the first case, the multi-mode temperature measuring device is operated at an ear-temperature measuring mode. As a result, the multi-mode temperature measuring device of the present invention can change measuring modes by simple operations so as to provide a convenient operation experience and remain the stability and accuracy of the temperature measurement.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A multi-mode temperature measuring device, comprising:
    a first case having a measuring portion and a bottom portion, wherein the measuring portion and the bottom portion are located at opposite sides of the first case, and the measuring portion has a first through hole;
    a second case connected with the first case and being rotatable from a first position to a second position with respect to the first case;
    an infrared (IR) sensing element disposed at the measuring portion and corresponding to the first through hole; and
    a wave-collection element disposed in the second case and having a second through hole; wherein, when the second case is located at the first position, the second through hole is disposed opposite to the first through hole, and when the second case is located at the second position, the second case is fixed at the bottom portion of the first case.

2. The multi-mode temperature measuring device of claim 1, further comprising a linking mechanism, wherein the second case is rotatable from the first position to the second position with respect to the first case via the linking mechanism.

3. The multi-mode temperature measuring device of claim 1, wherein when the second case is located at the first position, the wave-collection element and the IR sensing element are located opposite to each other, and an IR ray is collected by the wave-collection element and then received by the IR sensing element.

4. The multi-mode temperature measuring device of claim 1, wherein an inner profile of the wave-collection element is correspondingly fitting with an outer profile of the IR sensing element.

5. The multi-mode temperature measuring device of claim 1, wherein when the second case is located at the first position or the second position, the second case is locked with the first case.

6. The multi-mode temperature measuring device of claim 5, wherein when the second case is located at the first position, the multi-mode temperature measuring device is operated at a forehead-temperature measuring mode, and when the second case is located at the second position, the multi-mode temperature measuring device is operated at an ear-temperature measuring mode.

7. The multi-mode temperature measuring device of claim 1, wherein the second case has a top portion, and the wave-collection element is disposed in the top portion.

8. The multi-mode temperature measuring device of claim 7, wherein when the second case is located at the first position, the measuring portion is located in the top portion.

9. The multi-mode temperature measuring device of claim 7, wherein the top portion has an opening, and when the second case is rotated to the first position, the opening passes over the measuring portion.

10. The multi-mode temperature measuring device of claim 7, wherein the second case further has two connecting arms, and the top portion is connected to the first case through the connecting arms.

\* \* \* \* \*